(12) United States Patent
Jacob et al.

(10) Patent No.: US 9,326,584 B2
(45) Date of Patent: May 3, 2016

(54) MOLD FOR AN INJECTION MOLDED APPLICATOR HEAD

(71) Applicant: ELC Management LLC, Melville, NY (US)

(72) Inventors: Christophe Jacob, Franqueville-Saint-Pierre (FR); Herve F. Bouix, New York, NY (US)

(73) Assignee: ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 14/708,658

(22) Filed: May 11, 2015

(65) Prior Publication Data

US 2016/0023388 A1    Jan. 28, 2016

Related U.S. Application Data

(62) Division of application No. 14/337,787, filed on Jul. 22, 2014.

(51) Int. Cl.
| | |
|---|---|
| B29C 45/44 | (2006.01) |
| A45D 40/26 | (2006.01) |
| A46B 1/00 | (2006.01) |
| B29C 45/00 | (2006.01) |
| B29C 45/40 | (2006.01) |
| B29C 45/26 | (2006.01) |
| B29L 31/42 | (2006.01) |
| B29L 31/00 | (2006.01) |

(52) U.S. Cl.
CPC ............ *A45D 40/265* (2013.01); *A45D 40/262* (2013.01); *A46B 1/00* (2013.01); *B29C 45/00* (2013.01); *B29C 45/2602* (2013.01); *B29C 45/2628* (2013.01); *B29C 45/2626* (2013.01); *B29C 45/4005* (2013.01); *B29L 2031/42* (2013.01); *B29L 2031/718* (2013.01)

(58) Field of Classification Search
CPC ..................... B29C 45/4005; B29C 45/2626
USPC .................... 425/557, 805, 556, 444
See application file for complete search history.

(56) References Cited

U.S. PATENT DOCUMENTS

| | | | | |
|---|---|---|---|---|
| 4,422,986 A | * | 12/1983 | Cole | A46B 3/005 425/805 |
| 6,347,934 B1 | * | 2/2002 | Andersen | B29C 31/063 425/557 |
| 7,992,577 B2 | * | 8/2011 | De Brouwer | A45D 34/045 132/218 |

* cited by examiner

*Primary Examiner* — Tim Heitbrink
(74) *Attorney, Agent, or Firm* — Peter Giancana

(57) ABSTRACT

A molded cosmetic applicator head having a core that supports an array of perforated bristles arranged in rows and columns. Each perforated bristle comprises a textured lateral surface and a flat lateral surface, such that the surfaces of the bristles assume certain orientations. A mold for an injection molded applicator head is also described.

8 Claims, 17 Drawing Sheets

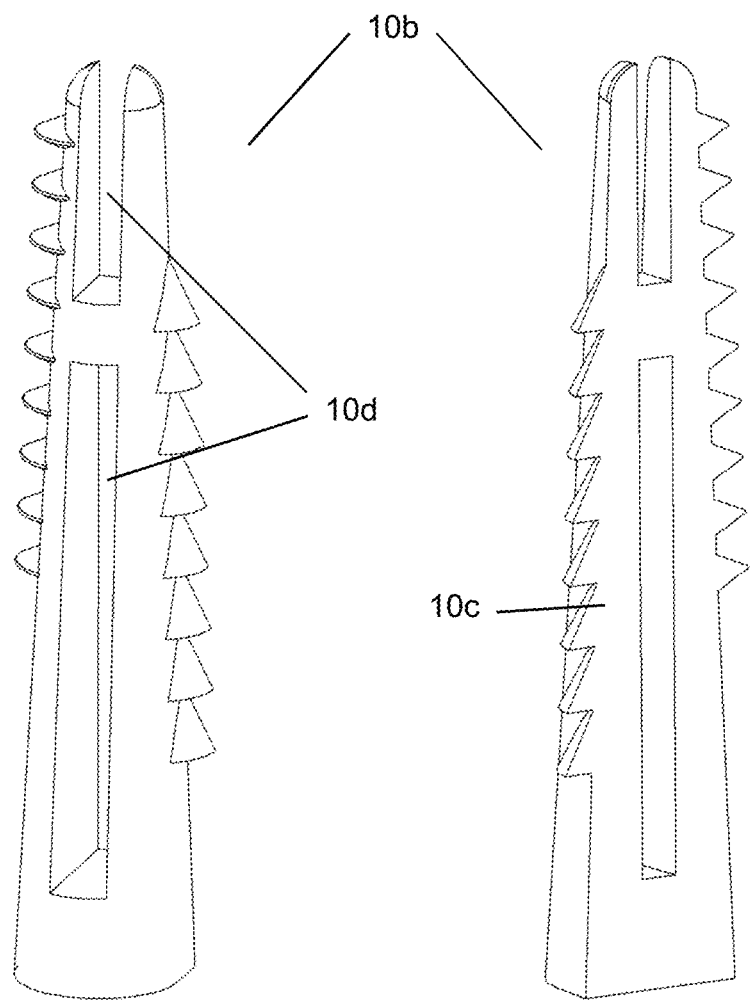
Fig16a                    Fig16b

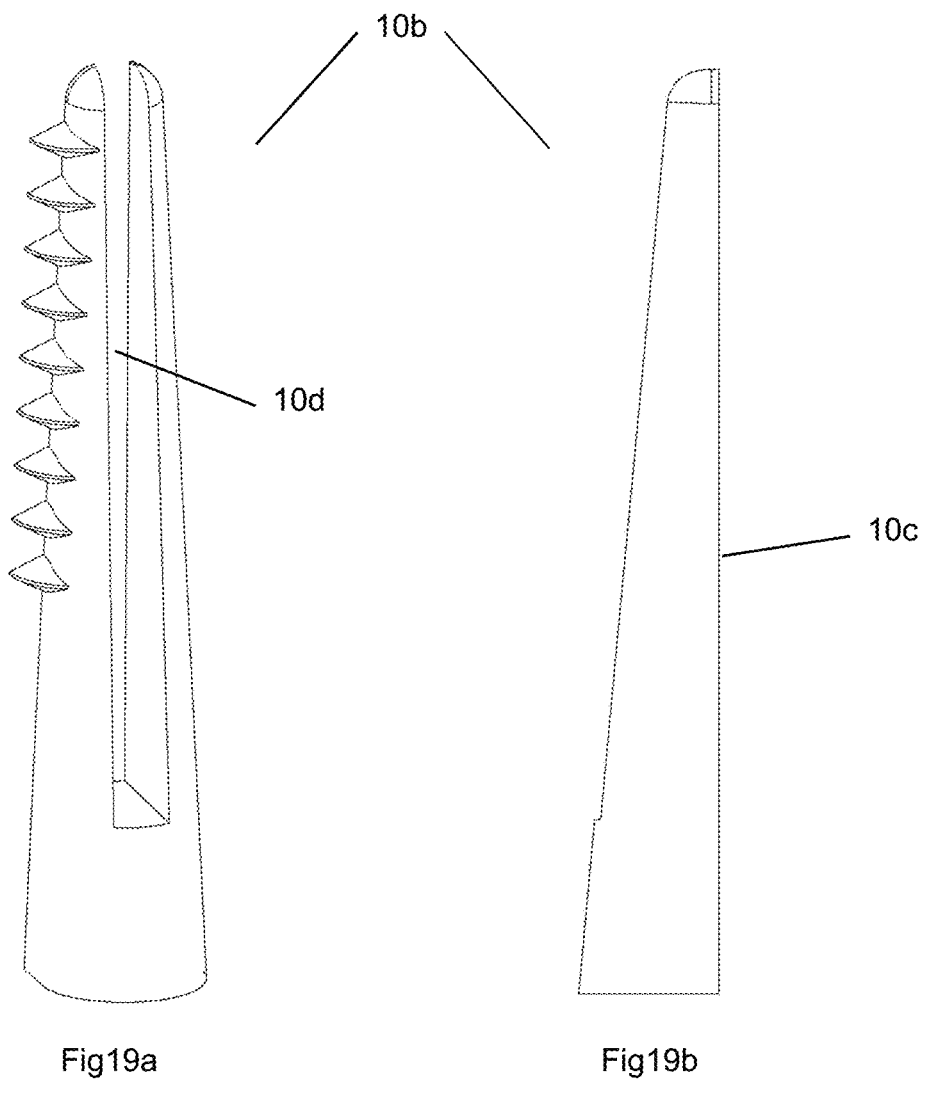

US 9,326,584 B2

MOLD FOR AN INJECTION MOLDED APPLICATOR HEAD

FIELD OF THE INVENTION

The invention is in the field of molded cosmetic applicators with uniquely shaped bristles, especially for delivering a high volume of product to the eyelashes, and for grooming the eyelashes and eyebrows.

BACKGROUND

Cosmetic applicators having molded applicator heads are known. Molded applicator heads typically comprise a core and several rows (for example, 4-12) of plastic or elastomeric bristles uniformly arranged around the core. The core may be formed as an elongated rod that has a distal end where the bristles are located, and a proximal end that is suitable for attaching to a handle. Alternatively, the core may be formed as a sleeve that supports the bristles, and that fits over an applicator rod.

The most common molded bristle has a cross section that is circular or semi-circular along its entire height. This type of bristle may be integrally molded simultaneously with the core, in one molding cycle. Being able to form a complete applicator head in one molding cycle is a significant advantage in time and cost. On the other hand, when the bristle cross sections are more complicated, then parts of the applicator head may have to be formed in successive molding cycles. A particular problem occurs when one tries to mold a complete applicator head (core and bristles) in one molding cycle, wherein the bristles have one or more perforations. One of the more significant problems is how to demold this type of applicator head without damaging it. The present invention addresses these concerns.

OBJECTS OF THE INVENTION

A main object of this invention is to create a molded applicator head (core and bristles) for a cosmetic applicator, the bristles having one or more perforations, wherein the core and bristles are molded in a single molding cycle.

Another object of the invention is to provide a mold that is suitable for molding cosmetic applicators with perforated bristles in a single molding cycle.

SUMMARY

We disclose molded cosmetic applicator heads, each head having a core that supports an array of bristles arranged in rows and columns, such that the surfaces of the bristles assume certain orientations, and wherein at least some of the bristles have at least one perforation. The bristles and applicator core are integrally molded in one injection molding cycle.

The perforations along the height of the bristles may grip the hair for improved separation of hairs and better definition. The perforations also act as reservoirs of product to provide a huge volumizing effect. The disclosed applicator heads may be used for eyelash makeup and treatment products, as well as eyebrow makeup and treatment products.

DESCRIPTIONS OF THE FIGURES

FIG. 9b depicts an enlarged portion of the mold section of FIG. 9a.

FIGS. 13a-19b depict examples of perforated bristles.

FIGS. 23a-e show draft angels for one particular design of perforated bristle.

DEFINITIONS

Throughout the specification, "perforated bristle", and similar phrases, shall refer to a channel that passes completely through the bristle.

"Comprise" and its conjugates mean that a composite structure is not limited to those elements that are explicitly recited, but may include additional elements.

Throughout the specification, the proximal end of the applicator head is the end nearer to the handle, as described below. The distal end of the applicator head is the end farther from the handle. The proximal end of a bristle is the end that attaches to the core of the molded applicator head. The distal end of the bristle is the free end of the bristle.

DETAILED DESCRIPTION

Mascara applicators typically comprise a handle, a rod or core extending from the handle, and an array of bristles projecting from the core. The present invention contemplates specific bristle shapes integrally molded with the core, in one molding cycle. The molded core and bristles may be referred to as the applicator head. The handle may also be integrally molded with the applicator head, or the applicator head may be attached to a handle at a later time.

The Mold

Figure 1:
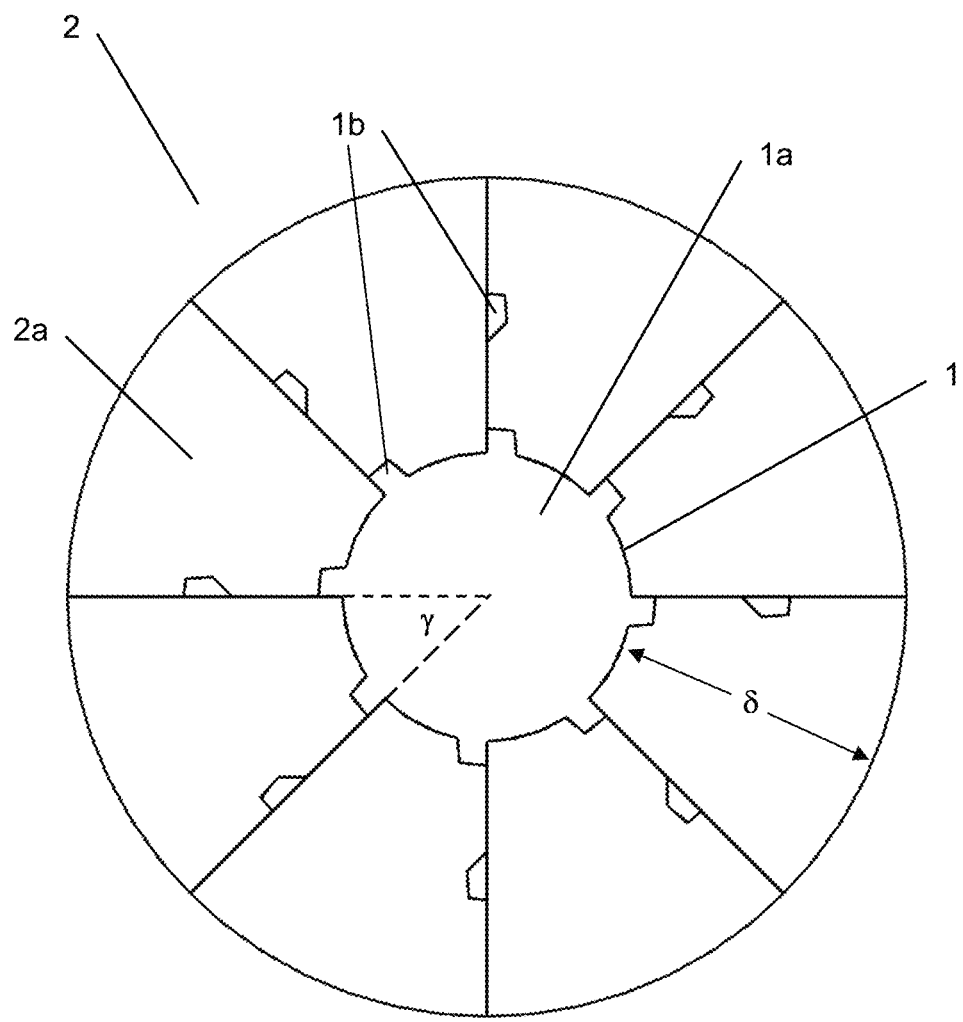
FIG. 1 is a cross sectional view of an eight section mold ready to be filed with molten material.

FIG. 1 depicts an assembled mold (2) according to the present invention that is suitable for forming bristles according to the present invention. The assembled mold is right circular cylindrical, and comprised of a number of mold sections that are shaped as truncated cylindrical sectors. While the mold (2) of FIG. 1 comprises eight separable mold sections (2a), molds according to the invention are not limited to eight sections. Regardless of the number of mold sections, when assembled, the mold sections define a mold cavity (1), into which plastic or elastomeric material will be injected. The mold cavity comprises a core space (1a) and a number of bristle spaces (1b). The core space has a longitudinal axis that extends along the length of the core space. The number of bristle spaces is equal to the number of bristles (10b) in a finished applicator head (10) that is formed from the mold.

Mold Sections

Figure 2A:
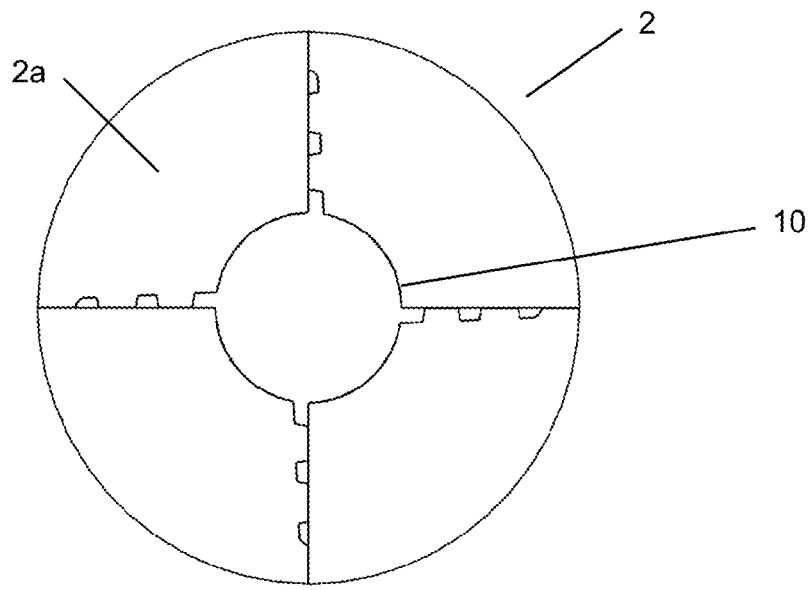
FIG. 2a depicts a four section mold.
Figure 2B:
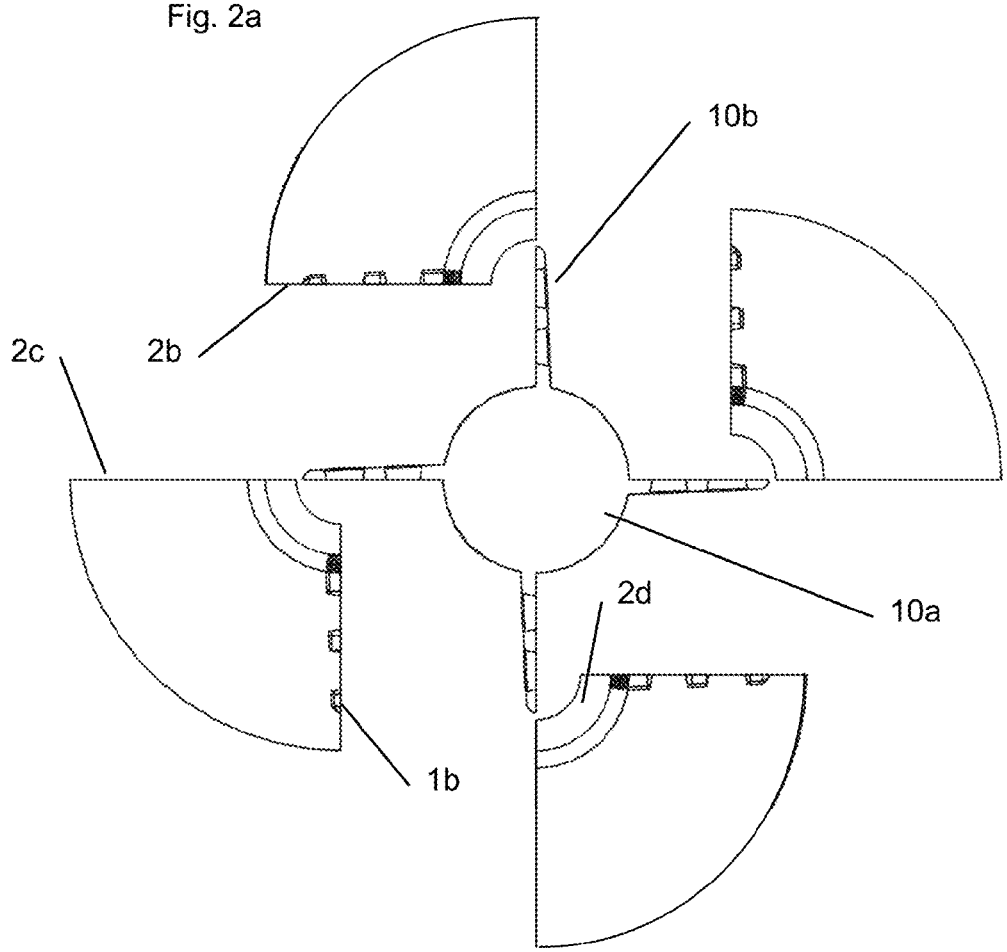
FIG. 2b shows an applicator head being released from a four section mold. Each mold section slides along a flat surface of a bristle.

FIGS. 2a and 2b depict a mold (2) comprising four mold sections (2a). Each mold section is shaped as a truncated cylindrical sectors, characterized by a sculpted lateral face (2b), a flat lateral face (2c), and an interior face (2d). The sculpted lateral face is flat except for bristle spaces (1b) cut into it. Each bristle space opens up onto the sculpted lateral face. In contrast, the flat lateral face is continuously flat, and has no bristle spaces therein. Consequently, each bristle has a flat face that corresponds to a flat lateral face of a mold section. Generally, one or more sections of a mold may differ from each other in overall size and shape, however, in preferred embodiments of the invention, the mold sections are the same overall size and shape. Also, in general, the bristles spaces in one or more mold sections may differ from each other, so that a single molded brush may have bristles of different shapes and sizes. Alternatively, all of the bristles in an assembled mold may be of the same type.

The sculpted lateral face (2b) and flat lateral face (2c) have a relative orientation defined by a central angle, $\gamma$. For example, in FIG. 1, we show eight identical sections in a mold, so that each mold section fills an angle of 360°/8=45°. More generally, we define M as the number of mold sections. When each mold section is the same size, then the central angle, $\gamma$, of each mold section is given by 360°/M. For example, when there are four, six, ten or twelve mold sections in a mold, each mold section fills an angle of 90°, 60°, 36° and 30°, respectively.

Figure 10:
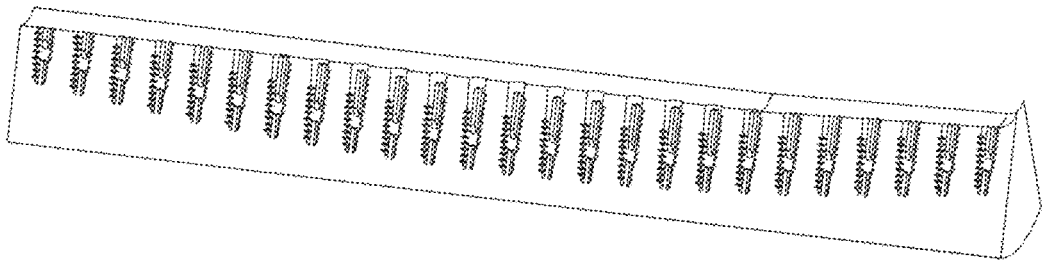
FIG. 10 shows one section of an eight section mold that will produce bristles having two perforations.
Figure 11:
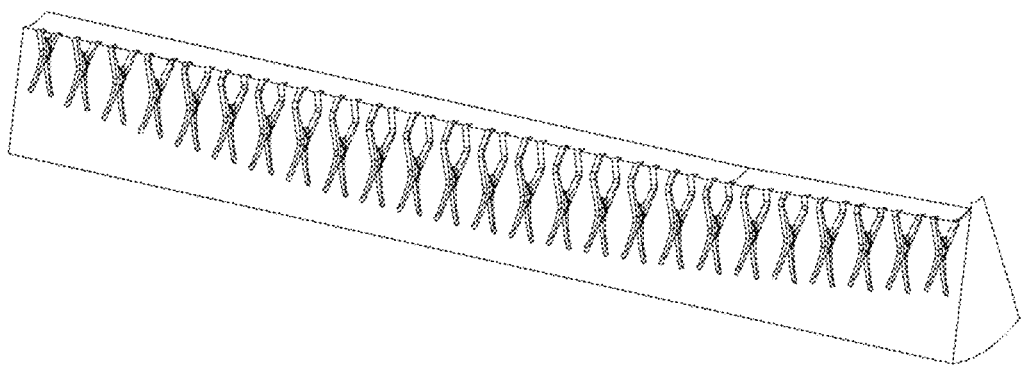
FIG. 11 shows one section of a ten section mold that will produce bristles having two perforations.
Figure 12:
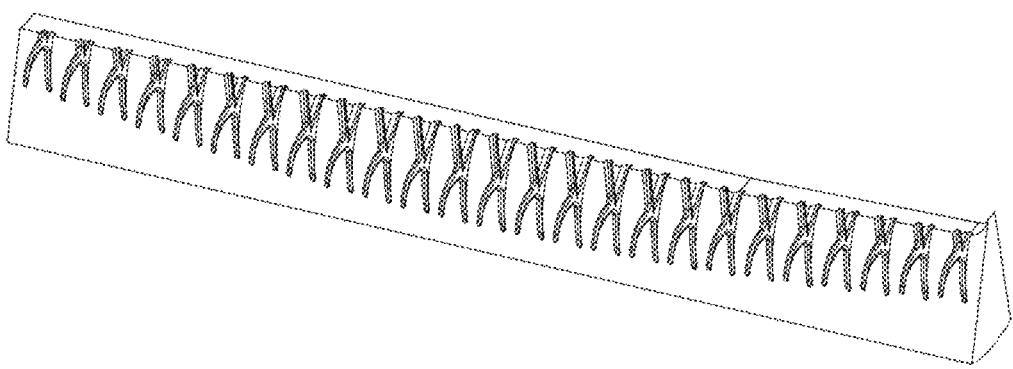
FIG. 12 shows one section of a twelve section mold that will produce bristles having two perforations.

In an assembled mold, the interior faces (2d) define the core space (1a) and the shape of the core (10a) of the molded article. In some preferred embodiments, the interior faces (2d) are curved, such that the core of the molded article will have a circular cross section. Preferably, the interior faces define a core that is approximately cylindrical. Alternatively, if the interior faces are straight, then the core would have a polygonal cross section. Optionally, the interior faces may define a core that has wider and narrower portions. In this case, the width, $\delta$, (see FIG. 1) of one or more mold sections would vary along the length of the mold section. For example, if the core of the molded applicator head is to be wider in the middle and tapered toward the distal (10f) and or proximal (10g) ends, then the mold sections would be narrower in the middle, and wider at their distal (2e) and proximal (2g) ends. FIGS. 10-12, for example, depict mold sections that are wider toward their distal ends.

The more sections (2a) in a mold, the more flexibility there is in designing cosmetic applicators of the present invention. However, increasing the number of mold sections makes the mold more difficult to operate in a commercial manufacturing environment. Therefore, in preferred embodiments, M=2-12. Molds with 5, 6, 10 or 11 sections (i.e. $\gamma$=72°, 60°, 36° or 32.72°, respectively) are more preferred. Molds with 7 sections ($\gamma$=51.43°) or 9 sections ($\gamma$=40°) are still more preferred, and exactly 8 sections ($\gamma$=45°) is most preferred. Of course, when there are relatively fewer columns of bristles (i.e. 4, 3 or 2; $\gamma$=90°, 120°, 180°) then the applicator performs more like a comb and less like a brush, but this is still within the scope of the present invention.

Figure 3:
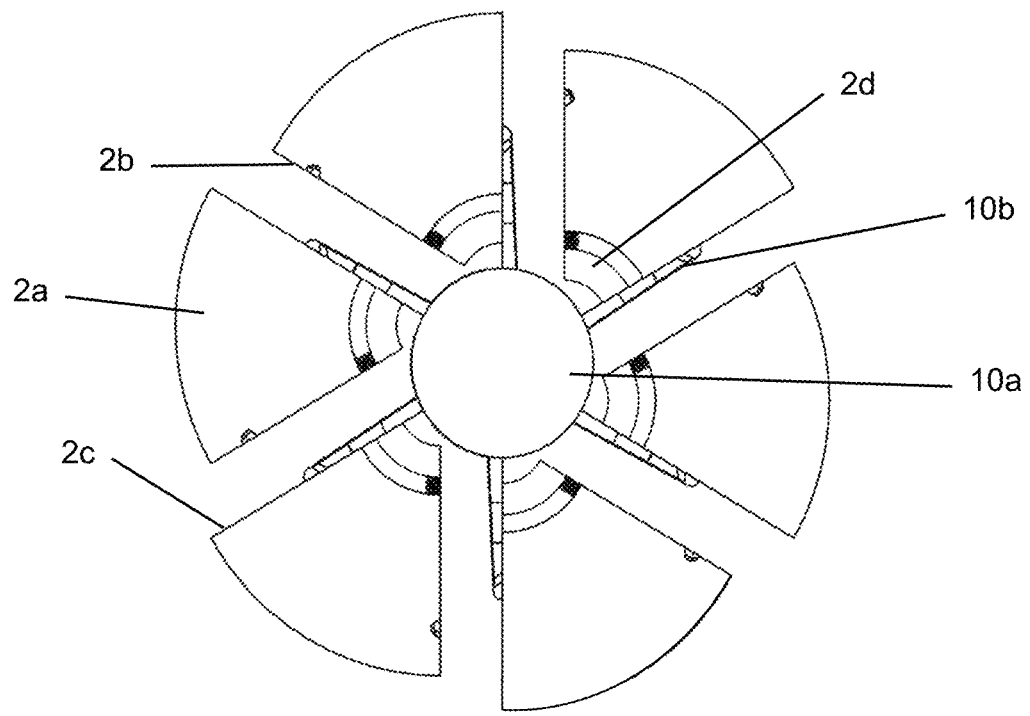
FIG. 3 depicts an applicator head being released from a six section mold.
Figure 4:
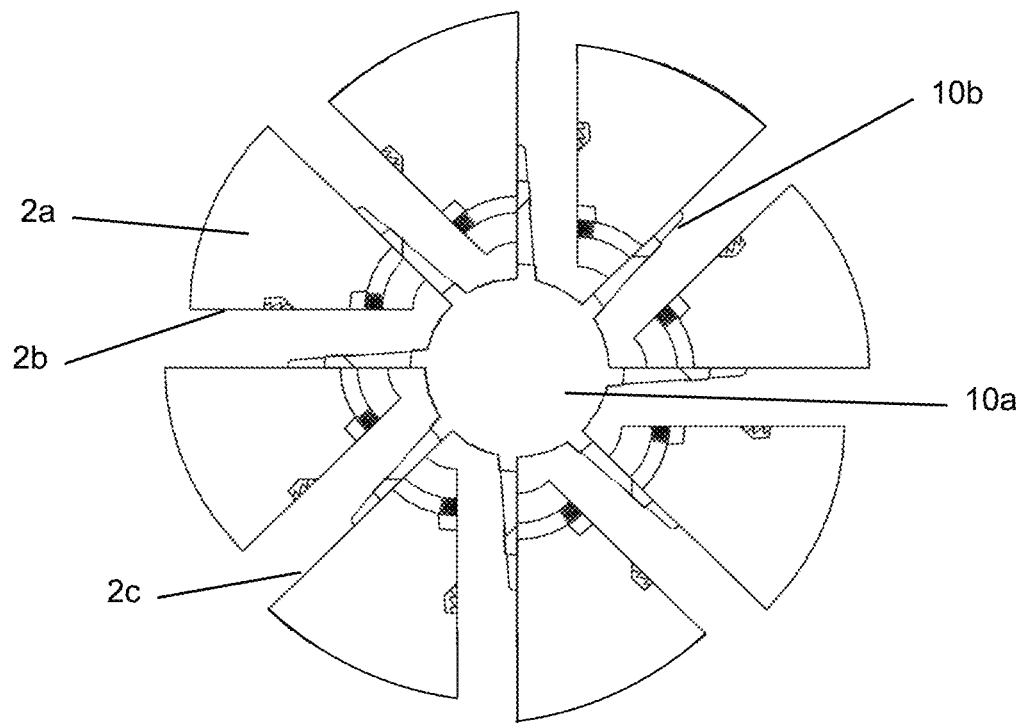
FIG. 4 depicts an applicator head being released from a eight section mold.
Figure 5:
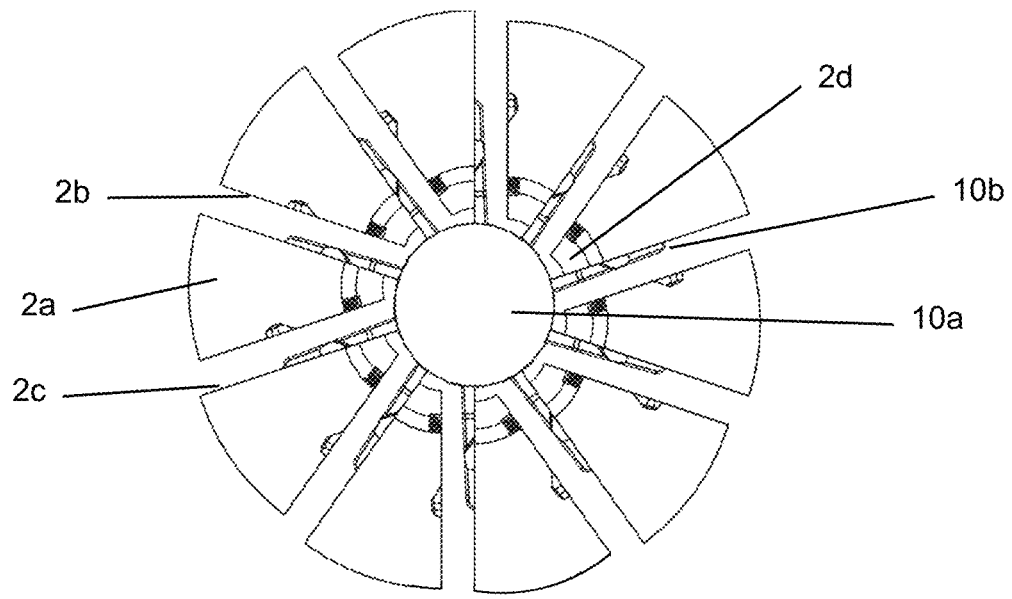
FIG. 5 depicts an applicator head being released from a ten section mold.
Figure 6:
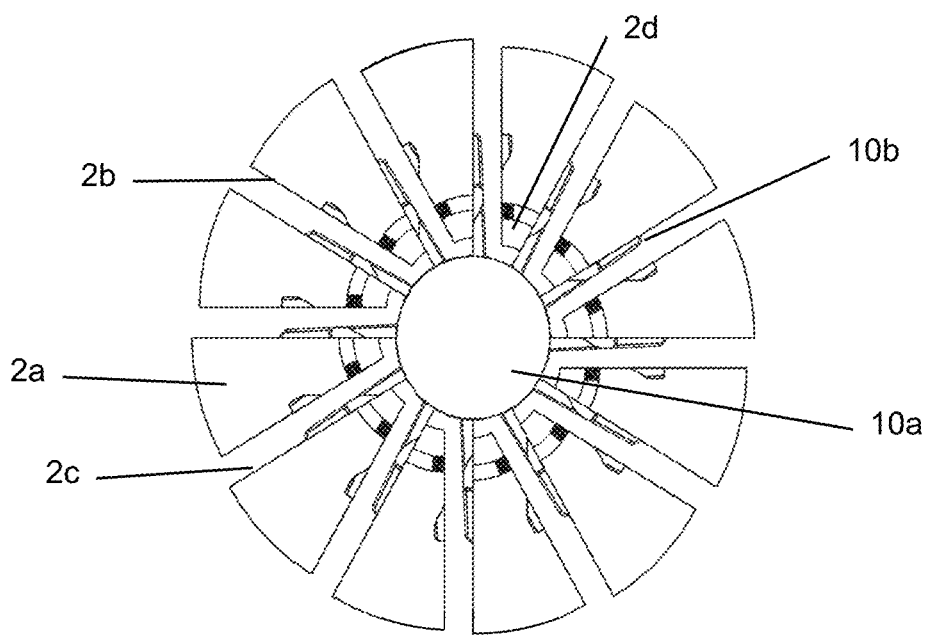
FIG. 6 depicts an applicator head being released from a twelve section mold.

In FIG. 2a, the mold sections (2a) are assembled, and the mold cavity (1) has been filled with molten material to form an applicator head (10). In FIG. 2b, the molded applicator head, comprising a core (10a) and bristles (10b), is being released from the mold (2) by moving each mold section parallel to its flat lateral face (2c). FIGS. 3a and 3b are analogous to FIGS. 2a and 2b for a six section mold. FIGS. 4a and 4b are analogous to FIGS. 2a and 2b for an eight section mold. FIGS. 5a and 5b are analogous to FIGS. 2a and 2b for a ten section mold. FIGS. 6a and 6b are analogous to FIGS. 2a and 2b for a twelve section mold. In FIGS. 2a-6b, the shape of the molded bristles (10b) happens to be the same, but bristle shape is not limited, except as explicitly explained herein. Other bristle shapes are shown below.

Bristle Spaces

In some preferred embodiments, bristle spaces (1b) are regularly arranged in columns that extend down the core space (1a), parallel to the longitudinal axis of the core space. In an assembled mold, a column of bristle spaces is defined by adjacent mold sections (2a) that contact each other. The number of columns in a mold equals the number of mold sections, M. This is because each mold section has one column of bristle spaces (1b) cut into its sculpted lateral face (2b). The number of bristle spaces in a column along the length of the core space will typically range from 5 to 50, preferably from 10 to 40, more preferably from 20 to 35 bristle spaces. For example, the mold section (2a) of FIG. 2c has 25 bristle spaces cut into it.

In some preferred embodiments, bristle spaces (1b) are regularly arranged in rows, each row lying on a circumference of the core space (1a), in a plane that is perpendicular to the longitudinal axis of the core space. It may be appreciated that the maximum number of bristle spaces in a row is equal to the number of mold sections, M. This is because each mold section may contribute only one bristle space or no bristle spaces to each row. In some preferred embodiments, all rows have M bristle spaces that are evenly spaced around a circumference of the core space.

In the most preferred embodiments, bristle spaces (1b) are regularly arranged in columns and rows. The bristle spaces of the mold typically extend radially from the core space (1a), so that in a molded applicator head (10), the bristles (10b) extend radially from the core (10a) of the applicator head. In terms of releasing the finished part from the mold without damaging the bristles, A row and column arrangement of radial bristle spaces is most preferred, but may not be absolutely necessary in every embodiment.

As noted above, each mold section (2a) has a sculpted lateral face (2b) and a flat lateral face (2c). In the assembled mold (2), a bristle space is defined by the sculpted lateral face of one mold section contacting the flat lateral face of an adjacent mold section. Thus, every bristle (10b) in the molded applicator head (10) has at least one flat face (10c) that extends the length of the bristle space. This flat face is free of features, such as prominent protrusions and prominent depressions, and is a characterizing feature of the bristle spaces of a mold according to the present invention. The other sides of the bristle spaces (1b) may comprise flat and/or rounded portions, and the horizontal cross section of the bristle space is limited only by the ability to machine the mold sections, and by demolding considerations.

Figure 7:
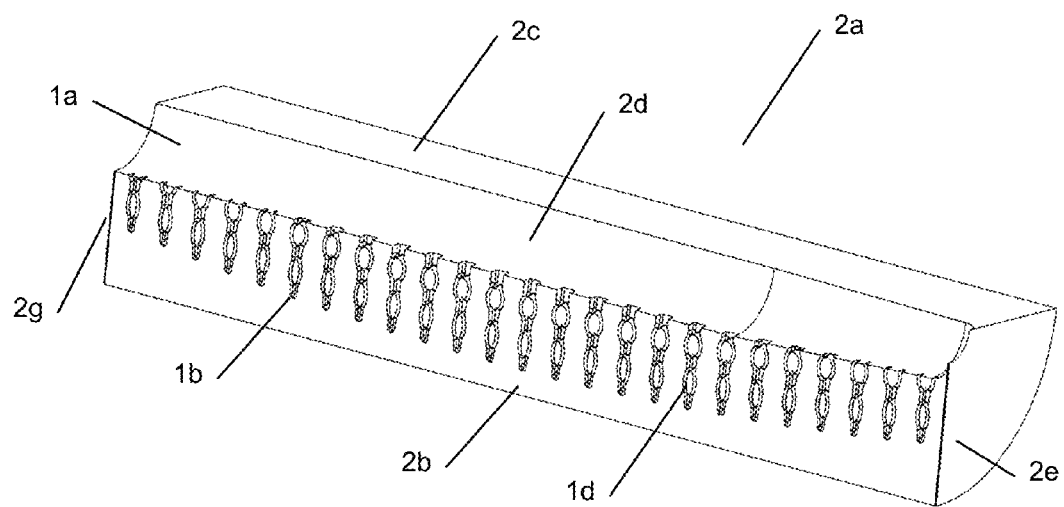
FIG. 7 shows one section of a four section mold that will produce bristles having two perforations.
Figure 8:
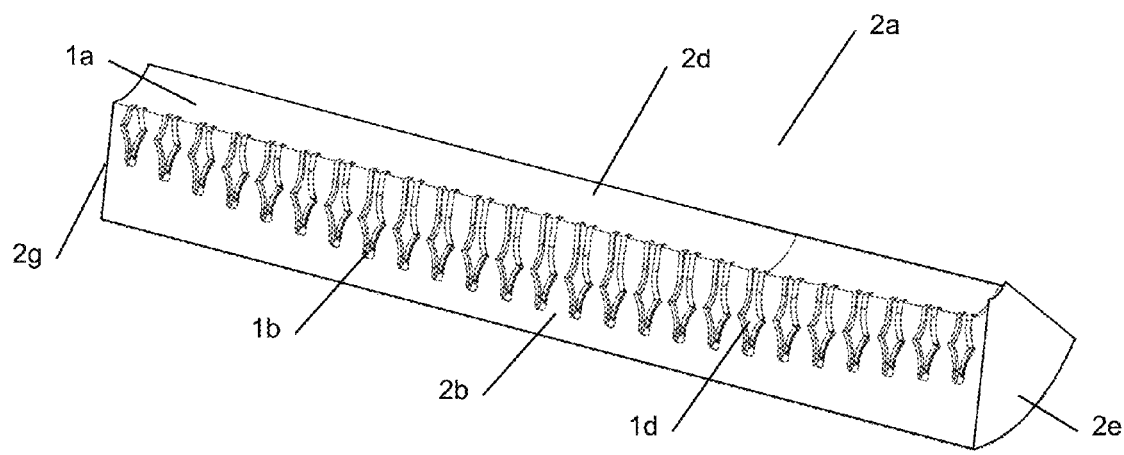
FIG. 8 shows one section of a six section mold that will produce bristles having one perforation.
Figure 9A:
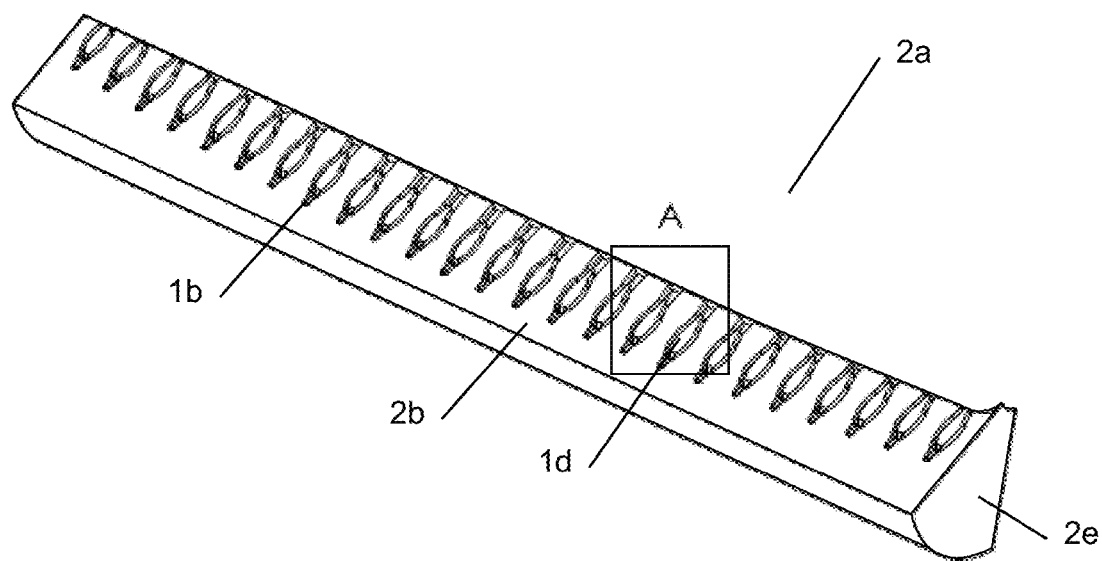
FIG. 9a shows one section of a six section mold that will produce bristles having one perforation.
Figure 9B:
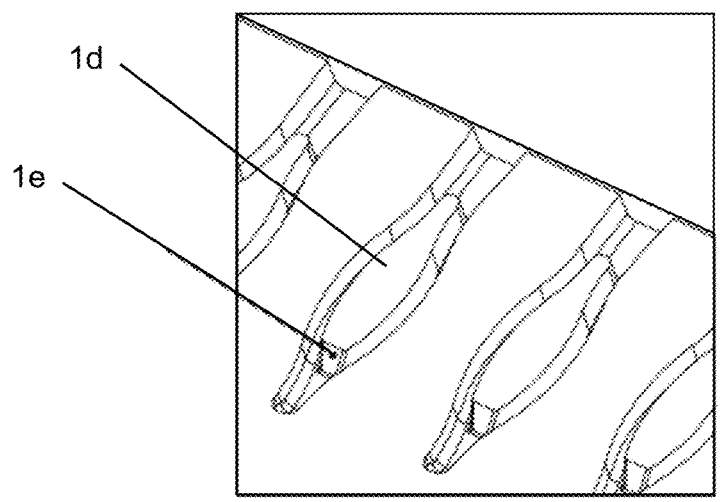
Figures 13A, 13B:
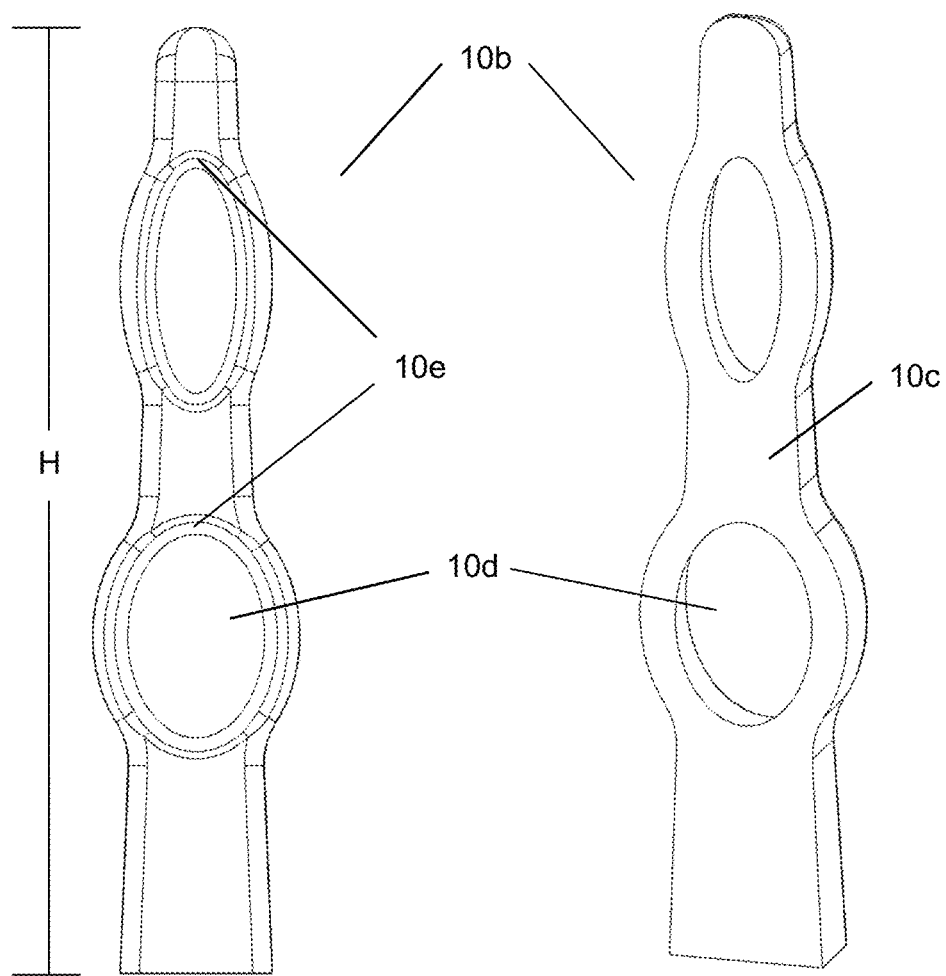
Figures 14A, 14B:
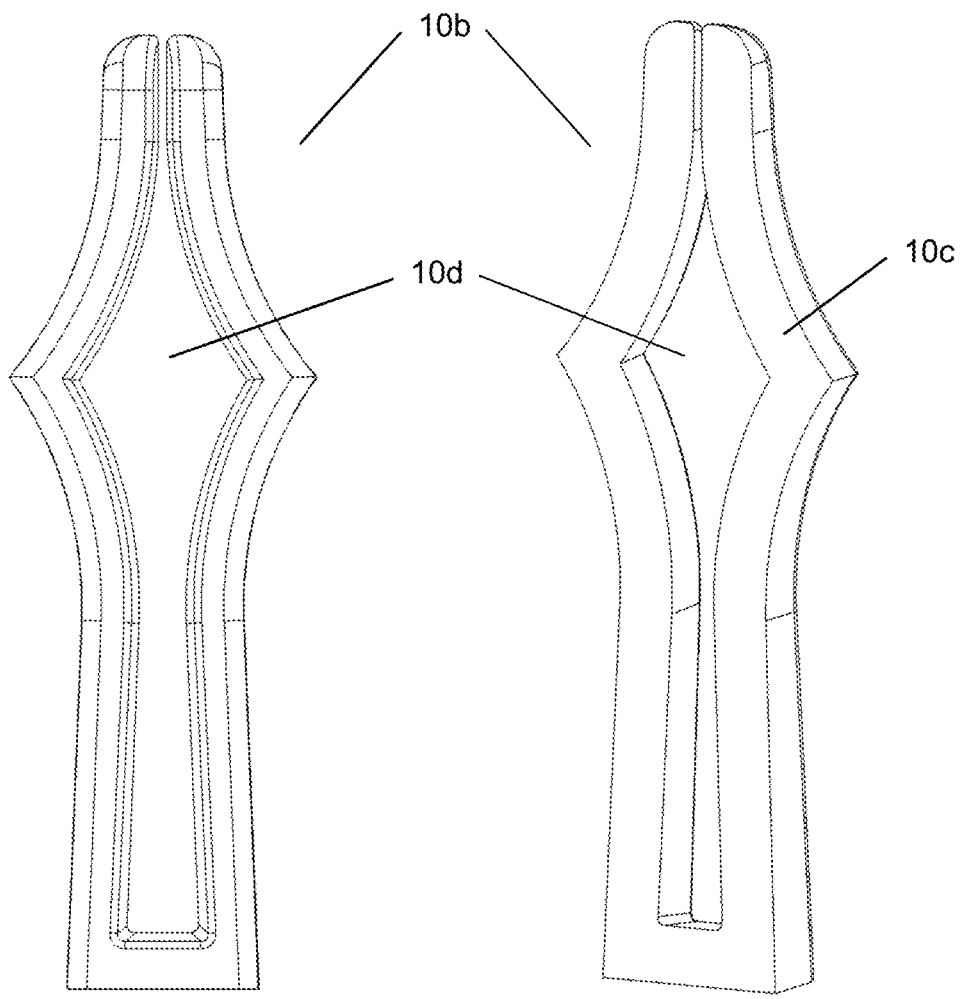
Figures 15A, 15B:
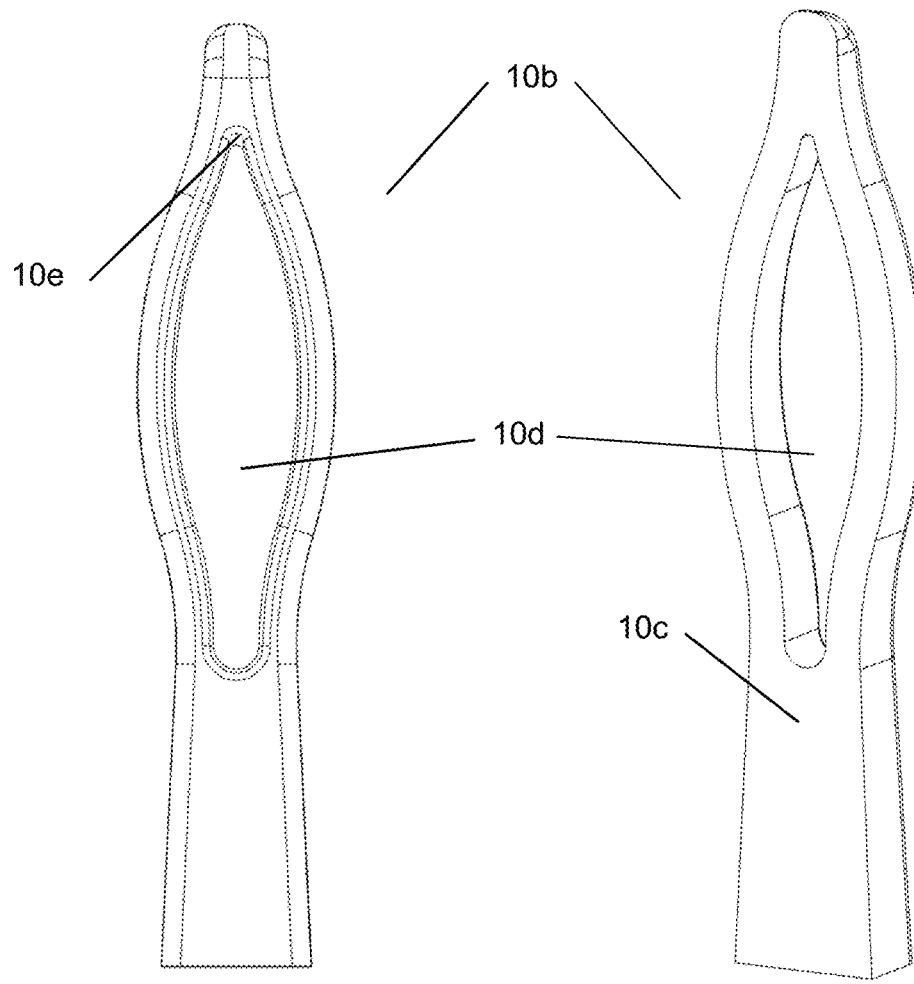
Figures 17A, 17B:
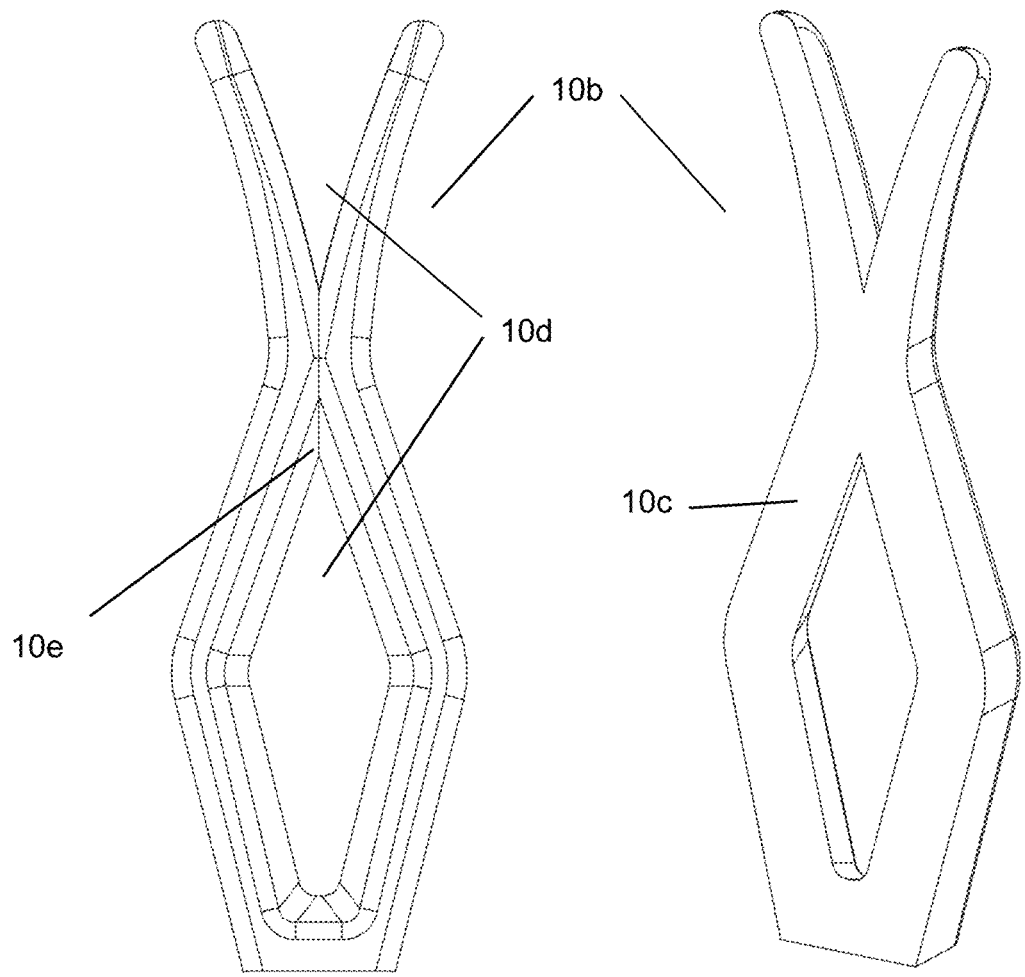
Figures 18A, 18B:
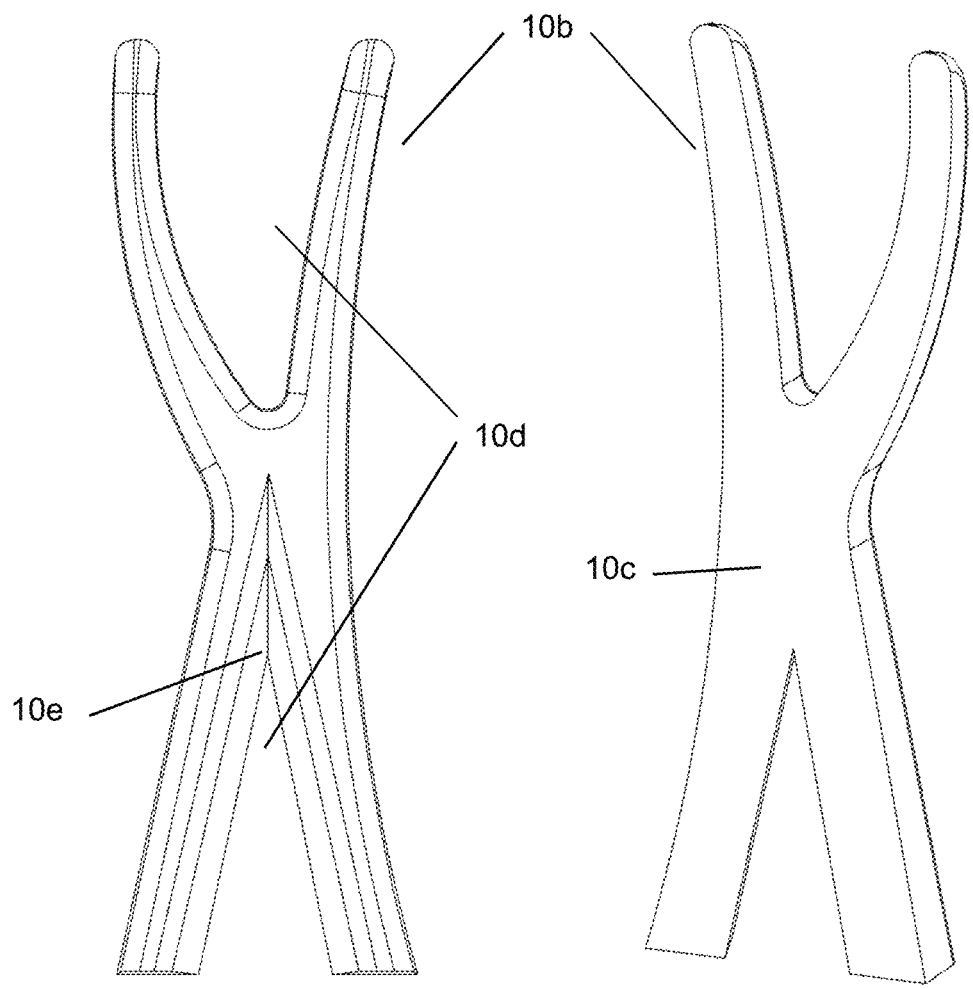

In an assembled mold (2) of the present invention, at least some of the bristle spaces (1b) have one or more protrusions (1d) that contact the flat lateral face (2c) of an adjacent mold section (2a). Such protrusions result in a perforated bristle (10b). Bristle perforations may be bounded or unbounded. A bounded perforation has an unbroken perimeter, which may include the core of the applicator head. Examples of these are shown in FIGS. 13a and 15a. An unbounded perforation has a break in its perimeter, where the perforation opens up to the exterior of the bristle. Examples of these are shown in FIG. 14a or 19a. Furthermore, the mold section of FIG. 7 will produce bristles having two bounded channels through each bristle. The mold section of FIG. 8 will produce bristles having one open channel through each bristle, while that of FIG. 9a will produce bristles having one bounded channel through each bristle. The mold sections of FIGS. 10-12 will produce bristles having one bounded and one open channel through each bristle. A bristle space that produces a bristle with a bounded perforation must be fashioned with a draft angle on the distal end (1e) of the protrusion (1d) (see FIG. 9b). These draft angles are important, and will be described more, below.

Furthermore, some or all of the bristle spaces (1b) may feature additional protrusions that do not contact the flat lateral face (2c) of an adjacent mold section (2a). Such protrusions result in depressions in the molded bristle. Conversely, any depression attached to the main part of a bristle space results in a protrusion on the molded bristle (see FIG. 10, for example, and the corresponding bristle in FIG. 16). These depressions and protrusions are deliberately machined into the bristle space, and do not arise as a result of random, macroscopic or microscopic surface irregularities. Examples of various bristles of the present invention are shown in FIGS. 13a-19b.

The Applicator Head

An applicator head (10) comprises core (10a) and an array of bristles (10b) projecting from the core. The present invention contemplates bristles having at least one perforation integrally molded with the core, in one molding cycle.

The Core

Figure 20A:
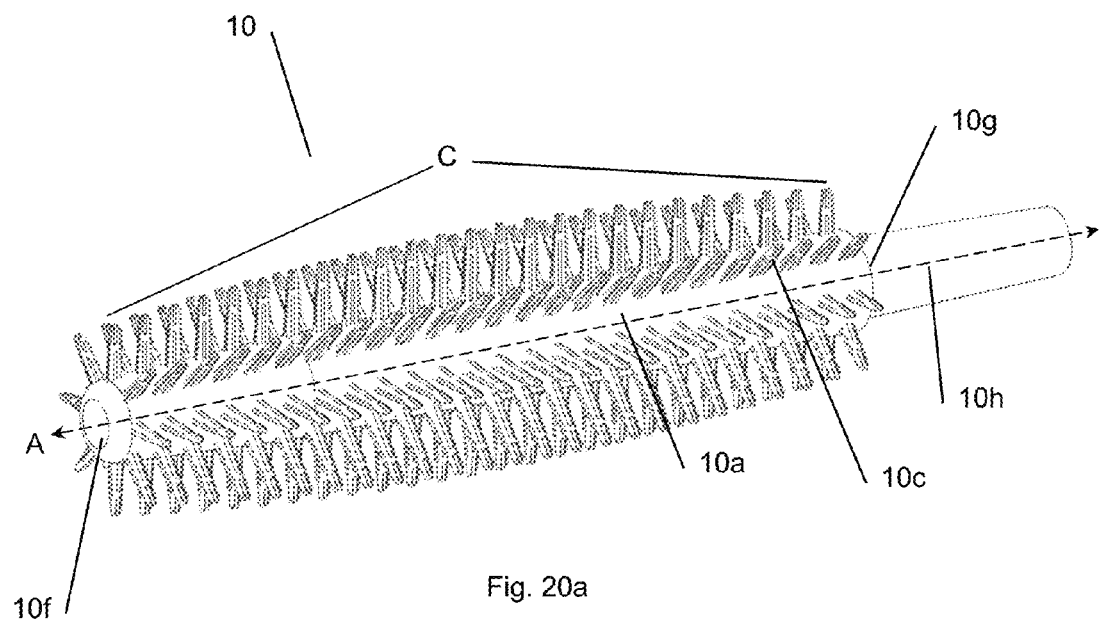
FIGS. 20a and 20b show two views of an applicator head with 8 columns of bristles symmetrically arranged.

Referring to FIG. 20a, the core (10a) of the applicator head (10) is integrally molded with the bristles (10b). The core may be of solid material or it may have a hollowed interior portion. A hollowed interior portion would require an additional die in the molding operation. Preferably, the core has a circular cross section. In some embodiments, the core is approximately cylindrical. Alternatively, the core may have wider and narrower portions. For example, in FIG. 20a, the core tapers toward the distal end (10f) of the applicator head.

Figure 21:
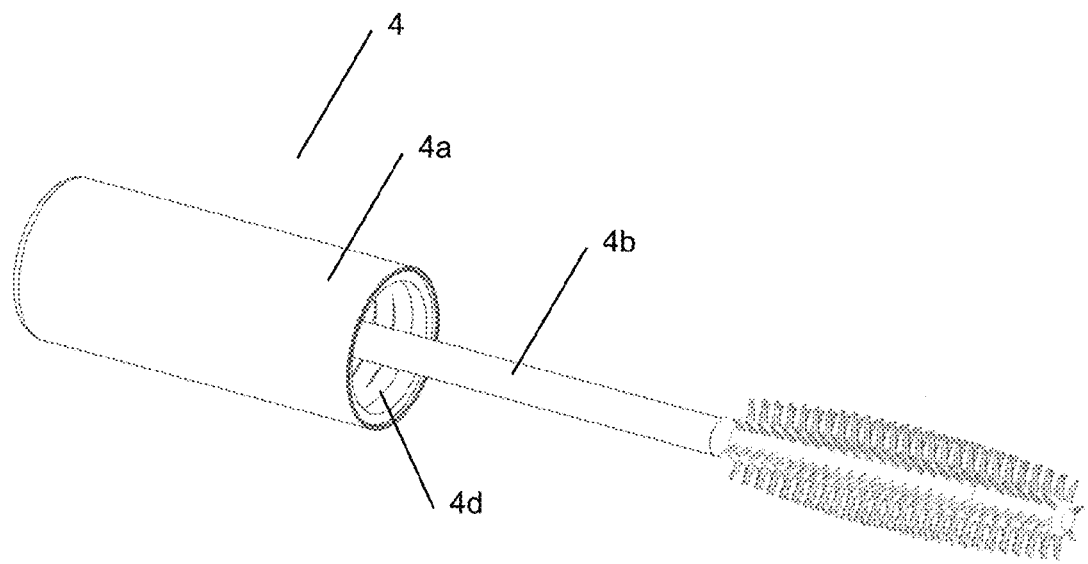
FIGS. 21 and 22 show an applicator head with 8 columns of bristles symmetrically arranged, and its assembly to a handle.
Figure 22:
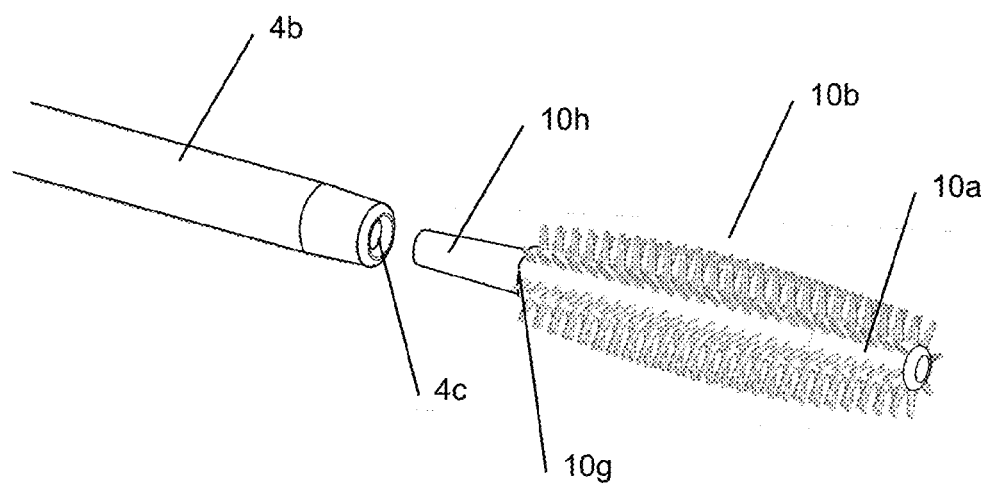
Figure 23A:
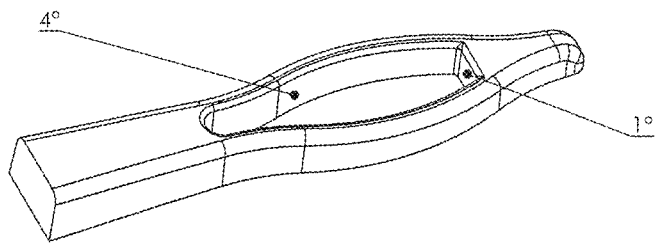
Figure 23B:
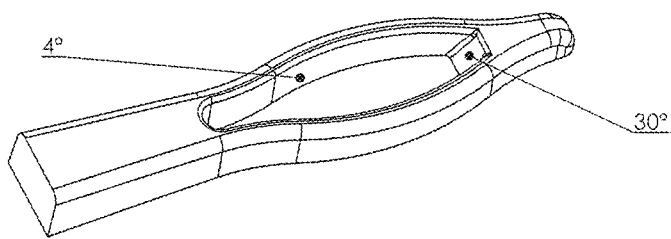
Figure 23C:
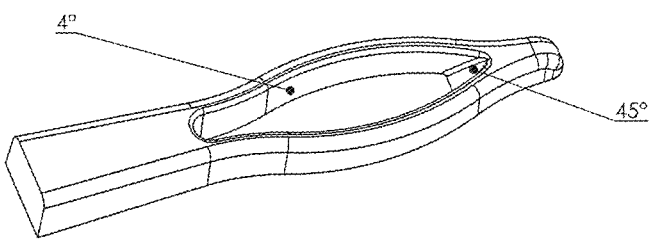
Figure 23D:
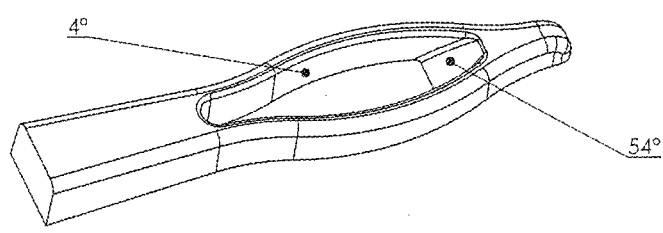
Figure 23E:
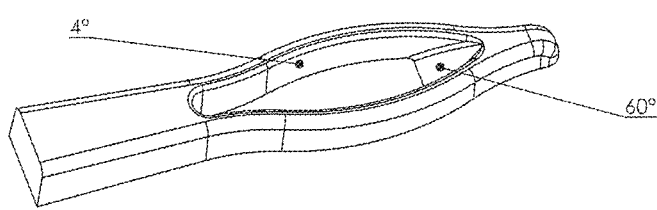

In some embodiments, a stem portion (10h) which is free of any bristles (10b) may depend from the proximal end (10g) of the core (10a) of the applicator head (10). The stem portion may have a diameter that is reduced compared to the diameter of the core. The reduced diameter is designed to facilitate the attachment of a handle. For example, referring to FIGS. 21 and 22, a typical handle (4) may comprise a closure (4a) that is able to attach to a reservoir of product. The handle may also comprises a rod (4b). The stem of the applicator head (10) may be retained in a hollow portion (4c) of the rod. Alternatively, the core (10a) of the applicator head (10) may have a hollowed portion that opens onto the proximal end (10g) of the core. This hollowed portion may be designed to receive and retain the rod (4b) of a handle (4). In general, the handle is of a type that is suitable for manipulating an eyelash or eyebrow cosmetic applicator, as known in the art. A typical handle may have a threaded engagement (4d) for attaching to a reservoir of product.

Bristles

Figure 20B:
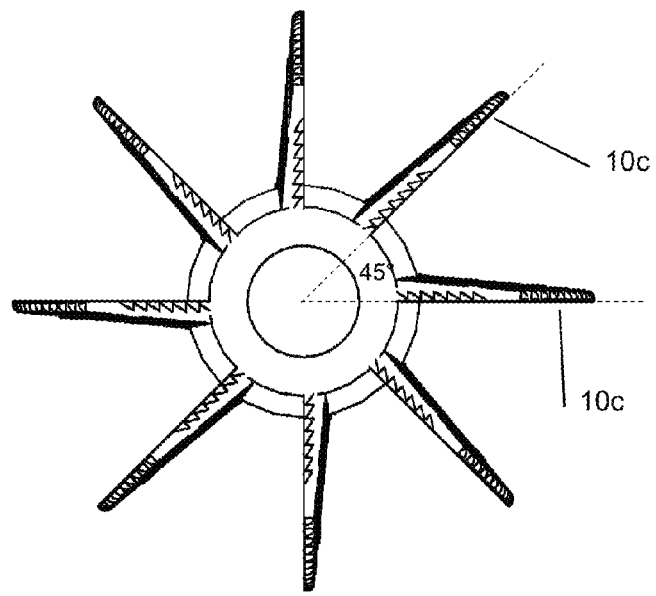

Each bristle space (1b) in the mold (2) will give rise to one bristle (10b) in a molded applicator head (10). Thus, the number of bristles in a finished applicator head is equal to the number of bristles spaces in the mold. As noted above, every bristle space (1b) in the mold is bordered by a flat lateral face (2c). Consequently, every bristle in a molded applicator head will have a flat surface (10c) that extends the full height, H, of the bristle, and that is free of surface features such as protrusions and depressions. The flat surface (10c) is a characterizing feature of the bristles of the present invention. During demolding, a mold section (2a) slides along this flat surface (10c) of the bristle. In a column, C, of bristles, all of the flat surfaces lie in the same plane and are parallel to the longitudinal axis, A, of the applicator head (see FIG. 20a). In a row of bristles, the flat surfaces of adjacent bristles are oriented to each other at an angle, $\gamma=360°/M$. For example, in FIG. 20b, $M=8$ and $\gamma=45°$. These orientations are a characterizing feature of the invention, and are important for allowing the molded applicator head to be ejected from the mold easily, with no damage.

Furthermore, at least some bristles of an applicator head according to the invention have at least one perforation (10d). A perforation is a channel that passes completely through the bristle. Preferably, at least half of the bristles that make up an applicator head have at least one perforation; more preferably at least 75%; most preferably at least 99% of the bristle in an applicator head have perforations. The perforations of the bristles may be any suitable size or shape. From one bristle to the next, the sizes and shapes of the perforations may be the same or different. Also, a perforation may be bounded or unbounded. A bounded perforation has an unbroken perimeter (see FIGS. 13a or 15a, for example). An unbounded perforation has a break in its perimeter, where the perforation opens up to the exterior of the bristle (see FIG. 14a or 19a, for example). The bristles depicted in FIGS. 16a, 17a and 18a have one bounded perforation and one unbounded perforation.

Within the limits herein described, the perforated bristles (10b) in an applicator head (10) may have any size and spacing suitable for its intended functions, e.g., application, arrangement, and/or separation of human hairs, such as eyelashes. For guidance, the height, H, of the bristles will range from about 0.1 mm to about 10 mm, preferably from 0.5 mm to 7 mm, and more preferably from 0.8 mm to 5 mm. The average cross-sectional diameter of the bristles ranges from about 0.1 mm to about 2 mm, preferably from about 0.2 mm to about 1.5 mm, and more preferably from about 0.3 mm to about 0.9 mm. Also, all the bristles in a single applicator head may be same or different. For example, all the bristles in a single applicator head may be same height, H, or not. The height of a bristle is measured from where the bristle rises from the core (10a) of the applicator head, to the free end of the bristle. FIG. 20a shows an example where the height of the bristles varies along the length of the core, being taller toward the middle of each column, and shorter toward the ends of each column. Optionally, within each row, the bristles may be the same height or different. Optionally, the bristles in any one column may be the same size and/or shape, or not. Optionally the shape of the bristles in one column may be different from the shape of the bristles in another column.

Material

Exemplary materials that can be used in the present invention to mold cosmetic applicator heads include, but are not limited to: silicone elastomers, thermoplastic elastomers (such as, for example, styrene-ethylene-butylene-styrene block copolymer—SEBS), vinyl elastomers (EVA), thermoplastic polyester elastomers (Hytrel® from Dupont de Nemours), thermoplastic polyurethane elastomers (Pellethane® from Dow Plastic), Nitrile, and EPDM. Hardness of the chosen material preferably ranges from about 35 MPa (35 shore D Hytrel® from Dupont de Nemours) to about 1180 MPa (82 shore D Hytrel®). More preferably the tensile modulus ranges from about 95 MPa (45 shore D Hytrel®) to about 570 MPa (72 shore D Hytrel®). Most preferably, tensile modulus ranges from about 200 MPa (55 shore D Hytrel®) to about 280 MPa (63 shore D Hytrel®).

Release From the Mold

Applicator heads as described herein, are preferably made by injection molding. When a set of mold sections (2a) are assembled, a mold cavity (1) is defined. Access into the mold cavity is through an opened end of the core space (1a). Molten material may be injected into the mold cavity through the opened end. When a molded applicator head is to be released from the assembled mold (2), the flat faces (2c) of the mold sections (2a) are made to move away from each other radially, and parallel to (or sliding along) the flat faces (10c) of the bristles (10b). This is most easily seen in FIGS. 2a-6. One or more sections of the mold may move simultaneously to release the molded component. Preferably, all sections of the mold move simultaneously to release the molded component, as this would put the least amount of stress on the molded bristles. For example, in a mold with eight sections, the mold sections retreat from each other at 45° increments (see FIG. 4). For a mold with ten sections, the mold sections retreat from each other at 36° increments (see FIG. 5), and for a mold with twelve sections, the mold sections retreat from each other at 30° increments (see FIG. 6), etc.

When a bristle comprises a bounded perforation, then the distal end of the bounded perforation must formed with a minimum draft angle that ensures that the bristle is not damaged during de-molding. The distal end (10e) of a perforation is the end nearer to the free end of the bristle. This draft angle, along with the orientation of the flat and textured lateral surfaces described above, make it more likely that the sculpted face (2b) of a mold section will pull away from the molded applicator head without subjecting the bristles to any appreciable stress, especially when both of the mold sections that define a bristle separate simultaneously. The minimum draft angle depends on the number of dies in the mold. Examples follow.

EXAMPLE 1

A Brush with 4 Columns of Bristles

The mold comprises 4 dies. During de-molding, each die moves parallel to its flat lateral surface (2c), at an angle of 360°/4=90° relative to its sculpted lateral surface (2b). In order for the bristles (10b) to freely de-mold from the die, the distal ends (10e) of any bounded perforations (10d) preferably have a draft of at least 1°. See FIG. 23a.

EXAMPLE 2

A Brush with 6 Rows of Bristles

The mold comprises 6 dies. During de-molding, each die moves parallel to its flat lateral surface (2c), at an angle of 360°/6=60° relative to its sculpted lateral surface (2b). In order for the bristles (10b) to freely de-mold from the die, the distal ends (10e) of any bounded perforations (10d) preferably have a draft of at least 30°. See FIG. 23b.

EXAMPLE 3

A Brush with 8 Rows of Bristles

The mold comprises 8 dies. During de-molding, each die moves parallel to its flat lateral surface (2c), at an angle of 360°/8=45° relative to its sculpted lateral surface (2b). In order for the bristles (10b) to freely de-mold from the die, the distal ends (10e) of any bounded perforations (10d) preferably have a draft of at least 45°. See FIG. 23c.

EXAMPLE 4

A Brush with 10 Rows of Bristles

The mold comprises 10 dies. During de-molding, each die moves parallel to its flat lateral surface (2c), at an angle of 360°/10=36° relative to its sculpted lateral surface (2b). In order for the bristles (10b) to freely de-mold from the die, the distal ends (10e) of any bounded perforations (10d) preferably have a draft of at least 54°. See FIG. 23d.

EXAMPLE 5

A Brush with 12 Rows of Bristles

The mold comprises 12 dies. During de-molding, each die moves parallel to its flat lateral surface (2c), at an angle of 360°/12=30° relative to its sculpted lateral surface (2b). In order for the bristles (10b) to freely de-mold from the die, the distal ends (10e) of any bounded perforations (10d) preferably have a draft of at least 60°. See FIG. 23e.

In all cases, the proximal ends of the perforations may have a draft angle of 0°, but a minimum of 0.5° is preferred practice. The draft of the bristle in its transverse cross section will be 0.5° minimum. For example, in FIGS. 23a-e, this draft angle is shown as 4°.

What is claimed is:

1. A mold for an injection molded applicator head comprising a number, M, of separable mold sections, wherein:
   each mold section fills an angle of 360°/M, and comprises an interior face, a flat lateral face, and a sculpted lateral face;
   when assembled each flat lateral face contacts the sculpted lateral face of an adjacent mold section, while the interior faces define a core space that has a longitudinal axis that extends along the length of the core space;
   the sculpted lateral faces are flat except for a number of bristle spaces cut into them;
   the flat lateral faces of adjacent mold sections are oriented to each other at an angle γ=360°/M degrees;
   the bristle spaces extend radially from the core space, and are regularly arranged in M columns that extend down the core space, parallel to the longitudinal axis;
   at least some of the bristle spaces comprise one or more protrusions that contact the flat lateral face of an adjacent mold section, and that is fashioned with a draft angle on the distal end of the protrusion.

2. The mold of claim 1 wherein each sculpted lateral face has from 5 to 50 bristle spaces.

3. The mold of claim 1 wherein M=2-12.

4. The mold of claim 1 wherein the core space is approximately cylindrical.

5. The mold of claim 1 wherein M=12, and the one or more protrusions have a minimum draft angle of 60°.

6. The mold of claim 1 wherein M=10, and the one or more protrusions have a minimum draft angle of 54°.

7. The mold of claim 1 wherein M=8, and the one or more protrusions have a minimum draft angle of 45°.

8. The mold of claim 1 wherein M=6, and the one or more protrusions have a minimum draft angle of 30°.

* * * * *